United States Patent
McLaren et al.

(10) Patent No.: US 6,456,021 B1
(45) Date of Patent: Sep. 24, 2002

(54) ROTATING VARIABLE FREQUENCY TRANSFORMER WITH HIGH VOLTAGE CABLES

(75) Inventors: Donald Gordon McLaren, Ontario (CA); Konrad Roman Weeber, Rexford, NY (US)

(73) Assignee: General Electric Company, Schenectady, NY (US)

( * ) Notice: Subject to any disclaimer, the term of this patent is extended or adjusted under 35 U.S.C. 154(b) by 42 days.

(21) Appl. No.: 09/824,904

(22) Filed: Apr. 4, 2001

Related U.S. Application Data

(60) Provisional application No. 60/215,671, filed on Jun. 30, 2000, and provisional application No. 60/215,670, filed on Jun. 30, 2000.

(51) Int. Cl.⁷ .................................................. H02P 5/20
(52) U.S. Cl. ........................ 318/146; 318/157; 363/171
(58) Field of Search ................................ 318/140, 146, 318/141, 147, 152, 157; 363/65, 68, 102, 170, 171; 323/348

(56) References Cited

U.S. PATENT DOCUMENTS

| | | |
|---|---|---|
| 3,471,708 A | 10/1969 | Rauhut |
| 3,654,378 A | 4/1972 | Rehder |
| 3,694,728 A | 9/1972 | Kanngiesser et al. |
| 3,701,938 A | 10/1972 | Chadwick |
| 3,823,248 A | 7/1974 | Christie et al. |
| 3,836,837 A | 9/1974 | Rauhut |
| 3,975,646 A | 8/1976 | Kilgore et al. |
| 4,019,115 A | 4/1977 | Lips |
| 4,071,882 A | 1/1978 | Rehder |
| 4,072,997 A | 2/1978 | Boothman et al. |
| 4,179,729 A | 12/1979 | Stanton et al. |
| 4,238,822 A | 12/1980 | Schade |
| 4,249,237 A | 2/1981 | Ronk et al. |
| 4,251,736 A | 2/1981 | Coleman |
| 4,302,716 A | 11/1981 | Glavitsch et al. |
| 4,336,488 A | 6/1982 | Glavitsch et al. |
| 4,430,574 A | 2/1984 | Ogiwara |
| 4,441,029 A | 4/1984 | Kao |
| 4,445,049 A | 4/1984 | Steigerwald |
| 4,489,261 A | 12/1984 | Hartwig et al. |
| 4,490,808 A | 12/1984 | Jasmin |
| 4,503,377 A | 3/1985 | Kitabayahi et al. |
| 4,517,471 A | 5/1985 | Sachs |
| 4,625,125 A | 11/1986 | Kuwabara |
| 4,683,718 A | 8/1987 | Larsson |
| 4,694,189 A | 9/1987 | Haraguchi et al. |
| 4,743,827 A | 5/1988 | Shiozaki et al. |
| 4,754,156 A | 6/1988 | Shiozaki et al. |
| 4,788,647 A | 11/1988 | McManus et al. |
| 4,794,544 A | 12/1988 | Albright et al. |
| 4,804,900 A | 2/1989 | Soeda |

(List continued on next page.)

FOREIGN PATENT DOCUMENTS

| | | |
|---|---|---|
| CA | 2 170 686 A | 10/1996 |
| DE | 1926878 | 7/1968 |

(List continued on next page.)

OTHER PUBLICATIONS

U.S. patent application Ser. No. 08/828,502, filed Mar. 31, 1997, entitled " Interconnection System for Transmitting Power Between Electrical Systems".

(List continued on next page.)

Primary Examiner—Khanh Dang
(74) Attorney, Agent, or Firm—Nixon & Vanderhye, P.C.

(57) ABSTRACT

A system for transferring power between a first electrical system and a second electrical system comprises a rotary transformer (105) comprising a rotor (110) having rotor windings and a stator (112) having stator windings. The windings of at least one of the rotor and the stator are high power cables utilized to obviate employment of a transformer between the one of the rotor and the stator and one of the first electrical system and the second electrical system.

10 Claims, 5 Drawing Sheets

U.S. PATENT DOCUMENTS

| | | | |
|---|---|---|---|
| 4,806,781 | A | 2/1989 | Hochstetter |
| 4,816,696 | A | 3/1989 | Sakayori et al. |
| 4,823,018 | A | 4/1989 | Kuwabara et al. |
| 4,870,558 | A | 9/1989 | Luce |
| 4,920,277 | A | 4/1990 | Kuwabara et al. |
| 4,922,124 | A | 5/1990 | Seki et al. |
| 4,941,079 | A | 7/1990 | Ooi |
| 4,992,721 | A | 2/1991 | Latos |
| 4,994,684 | A | 2/1991 | Lauw et al. |
| 5,111,377 | A | 5/1992 | Higasa et al. |
| 5,166,597 | A | 11/1992 | Larsen et al. |
| 5,239,251 | A | 8/1993 | Lauw |
| 5,341,280 | A | 8/1994 | Divan et al. |
| 5,343,139 | A | 8/1994 | Gyugyi et al. |
| 5,402,332 | A | 3/1995 | Kopf |
| 5,469,044 | A | 11/1995 | Gyugyi et al. |
| 5,550,457 | A | 8/1996 | Kusase et al. |
| 5,608,615 | A | 3/1997 | Luce |
| 5,742,515 | A | 4/1998 | Runkle et al. |
| 5,754,420 | A * | 5/1998 | Luce .......................... 363/102 |
| 5,841,267 | A | 11/1998 | Larsen |
| 5,853,294 | A | 12/1998 | Rehder |
| 5,886,443 | A | 3/1999 | Dymond et al. |
| 5,952,816 | A | 9/1999 | Larsen |
| 5,953,225 | A | 9/1999 | Larsen |
| 5,989,702 | A | 11/1999 | Draper et al. |
| 6,169,489 | B1 | 1/2001 | Kliman et al. |
| 6,275,396 | B1 * | 8/2001 | Farrar .......................... 363/65 |

FOREIGN PATENT DOCUMENTS

| | | |
|---|---|---|
| DE | 1 488 773 | 4/1969 |
| DE | 2062853 | 12/1970 |
| DE | 34 43 428 A1 | 6/1985 |
| EP | 0 739 087 A | 10/1996 |
| GB | 1 157 885 | 7/1969 |
| GB | 2 055 515 A | 3/1981 |

OTHER PUBLICATIONS

U.S. patent application Ser. No. 09/443,220, filed Nov. 18, 1999, entitled "Power Flow Control With Rotary Transformers On Common Drive Shaft".

U.S. patent application Ser. No. 09/731,879, filed Dec. 8, 2000, entitled "Envelope for Slip–Ring Contacting Members in High–Power Rotary Current Collection System".

U.S. patent application Ser. No. 09/731,875, filed Dec. 8, 2000, entitled "Cleaning/Cooling of High–Power Rotary Current Collector System".

U.S. Provisional application Ser. No. 60/215,670, filed Jun. 30, 2000, entitled "High–Power Rotary Current Collect System".

Enrique Lopez P., et al, "Control and Planning of 50/60 Hz Industrial System Load Flows", Aug. 1990, Proceedings of the Colloquium in S. America, Argentina, Brazil, Chile, Uruguay, pp. 162–167.

Strowger et al, "Speed Changes of Hydraulic Turbines for Sudden Changes of Load", No. 2009, The American Society of Mechanical Engineers, Presented at the Spring Meeting of the Society, San Francisco, CA, Jun. 28–Jul. 1, 1926, pp. 209–211 and 214–215.

Rauhut, "The Rotary Transformer", *Brown Boveri Review*, Sep. 1967, vol. 54, No. 9, pp. 554–564.

Rauhut et al., "Rotary Transformer Improves Interconnection", *Electrical World*, May 16, 1966, pp. 71–72.

U.S. patent application Ser. No. 09/731,877, filed Dec. 8, 2000, entitled "Slip–Ring Mounting Assembly for High-Power Rotary Current Collection System".

Goto et al, "Power System Stabilizing Control by Adjustable Speed Pumped Storage Power Station Using Stabilizing Signals", CIGRE Symposium Tokyo 1995, pp. 1–6.

Puchstein, Lloyd, Conrad, "Alternating–Current Machines", 3rd Edition, John Wiley & Sons, Inc., NY, 1954, pp. 425–428, particularly Fig. 275 on p. 428.

Kron, "Equivalent Circuits of Electric Machinery", John Wiley & Sons, Inc., NY, Chapman & Hall, Ltd., London, 1951, pp. 150–163, particularly Fig. 9.5a on p. 156.

Larsen, et al, "Specification of AC Filters for HBDC Systems", IEEE Y&D Conference, New Orleans, 1989, pp. 1–8.

"Inductrol Voltage Regulators", General Electric Company, Publication 6070, Jun. 1974, pp. 30–31.

"Magnetic Circuits and Transformers", John Wiley & Sons, Inc., New York, pp. 497–515.

"Rotary Converter", Westinghouse Electric & Manufacturing Company, Circular No. 1028, Apr. 1903.

* cited by examiner

ROTATING VARIABLE FREQUENCY TRANSFORMER WITH HIGH VOLTAGE CABLES

This application claims the benefit and priority of U.S. Provisional patent application Serial No. 60/215,671, filed Jun. 30, 2000, which is incorporated herein by reference in its entirety. This application is related to U.S. Provisional Patent Application Serial No. 60/215,670, filed Jun. 30, 2000, entitled "HIGH-POWER ROTARY CURRENT COLLECTOR SYSTEM", U.S. patent application Ser. No. 09/731,875, filed Dec. 8, 2000, entitled "CLEANING/COOLING OF HIGH-POWER ROTARY CURRENT COLLECTOR SYSTEM"; U.S. patent application Ser. No. 09/731,879, filed Dec. 8, 2000, entitled "ENVELOPE FOR SLIP-RING CONTACTING MEMBERS IN HIGH-POWER ROTARY CURRENT COLLECTOR SYSTEM"; and U.S. patent application Ser. No. 09/731,877, filed Dec. 8, 2000, entitled "SLIP-RING MOUNTING ASSEMBLY FOR HIGH-POWER ROTARY CURRENT COLLECTION SYSTEM", all of which are incorporated herein by reference in their entirety

BACKGROUND OF THE INVENTION

Rotary transformers have been utilized for coupling multi-phase systems. See, for example, U.S. Pat. No. 3,471,708 to Rauhut wherein a non-synchronous rotary machine has stator windings connected to a first three-phase power system grid and rotor windings connected to a second three-phase system grid. If the frequency of one system is different from that of the second system, a torque is exerted on the rotor in one direction or the other so as to cause rotation of the rotor at a rotational rate equal to the difference between the network frequencies.

In one example deployment of a rotary transformer, a rotary transformer system is connected to transfer electrical power between a first electrical system (e.g., first electrical grid) and a second electrical system (e.g., second electrical grid). In such deployment, one of the rotor assembly and the stator is connected (e.g., by three phase lines) to the first electrical system, and the other is connected to the second electrical system. A drive motor rotates the rotor assembly in response to a drive signal generated by a control system. The first and second electrical systems may have a differing electrical characteristic (e.g., frequency or phase). The control system can bi-directionally operate the rotary transformer system at a variable speed for transferring power from the first electrical system to the second electrical system or vice versa (i.e., from the second electrical system to the first electrical system). Further information concerning such example deployment and variations thereof are disclosed in the following, all of which are incorporated herein by reference in their entirety: U.S. Pat. Nos. 5,953,225; 5,742,515; 5,841,267 5,952,816; U.S. patent application Ser. No. 08/825,502; and U.S. patent application Ser. No. 09/443,220.

Rotating electrical machines such as the rotary transformer/converter discussed above are normally manufactured and designed at operating voltages of 4 kV to 25 kV. Such being the case, heretofore on each side thereof the rotating transformer/converter a transformer must be employed in order to connect to typical transmission level voltages of 15 kV to 400 kV.

BRIEF SUMMARY OF THE INVENTION

A rotary transformer system obviates the need for transformers for connecting to a high voltage electrical system such as an electrical grid or the like by using high voltage cables as one or both of rotor windings and stator windings. The rotary transformer system is driven by an electrical machine.

Thus, in accordance with the present invention, the windings of at least one of the rotor and the stator are high power cables utilized to obviate employment of a transformer between the one of the rotor and the stator and one of the first electrical system and the second electrical system. In alternate embodiments, the high power cables can be used for windings of one or both of the rotor and stator. The high power cables are capable of operation with greater than 30 kV, e.g., and may operate as high as 100 kV or even higher (e.g., 500 kV). In non-limiting, representative example embodiments, the high power cables are formed from one of cross-linked polyethylene and ethylene propylene rubber.

DETAILED DESCRIPTION OF THE INVENTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
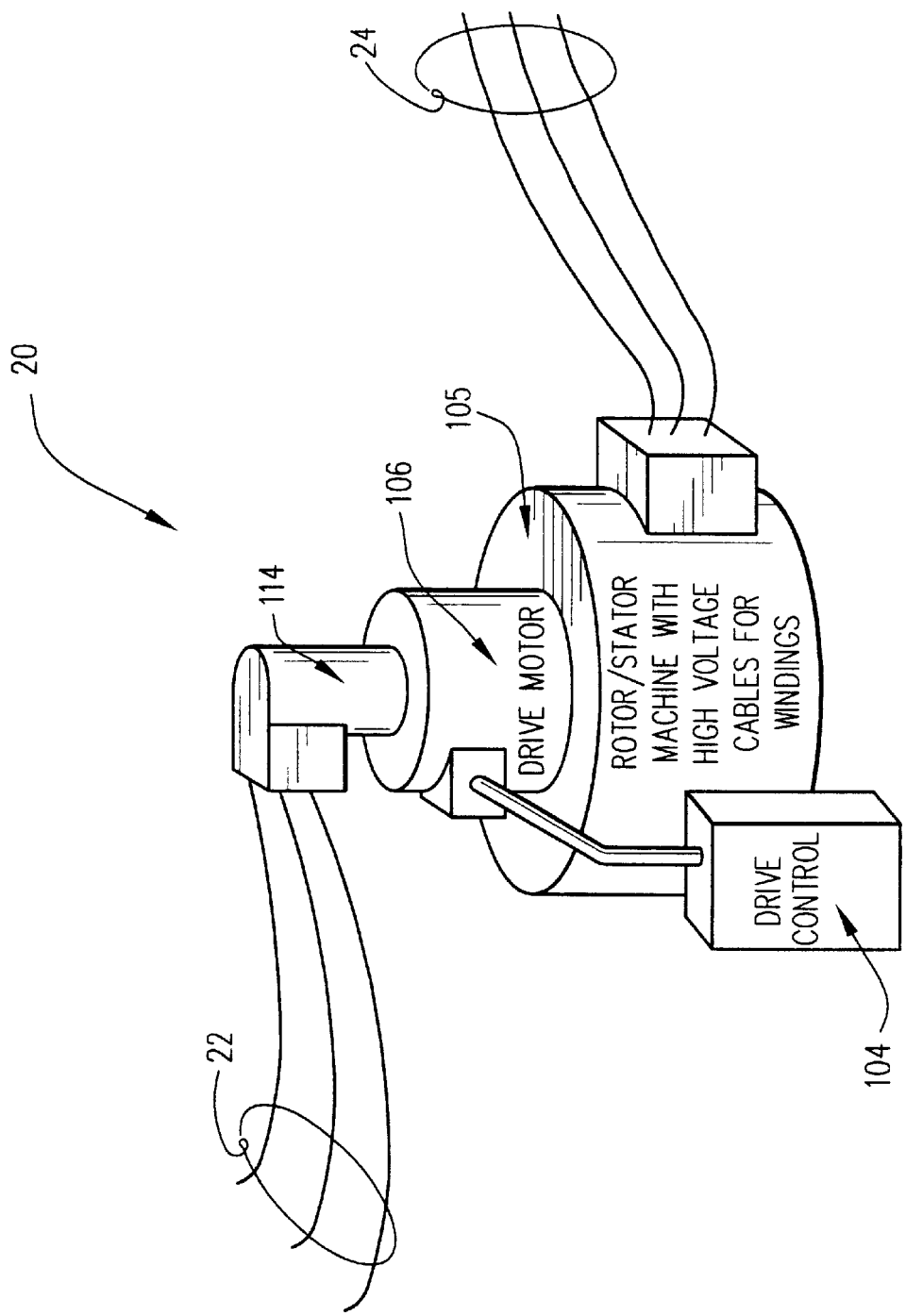
FIG. 1 is a diagrammatic view of a variable frequency rotary transformer system according to a first embodiment of the invention.

FIG. 1 shows a variable frequency rotary transformer system 20 according to a first embodiment of the present invention. The variable frequency rotary transformer system 20 operates in a high voltage, high current environment having alternating voltages and current. The variable frequency rotary transformer system 20 is connected to transfer electrical power between a first electrical system (e.g., first electrical grid, represented by wires 22) and a second electrical system (e.g., second electrical grid, represented by wires 24).

The variable frequency rotary transformer system 20 includes a drive control system 104; rotary transformer assembly 105; and a torque control unit 106 (also known as the rotor drive motor or drive motor). The drive control system 104 is employed to control the torque control unit 106. As further shown in FIG. 2, the rotary transformer assembly 105 includes both a rotor subassembly 110 and a stator 112. The rotor subassembly 110 includes a rotatable shaft 113, a collector ring assembly 114, and a rotor cage section 116.

Figure 2:
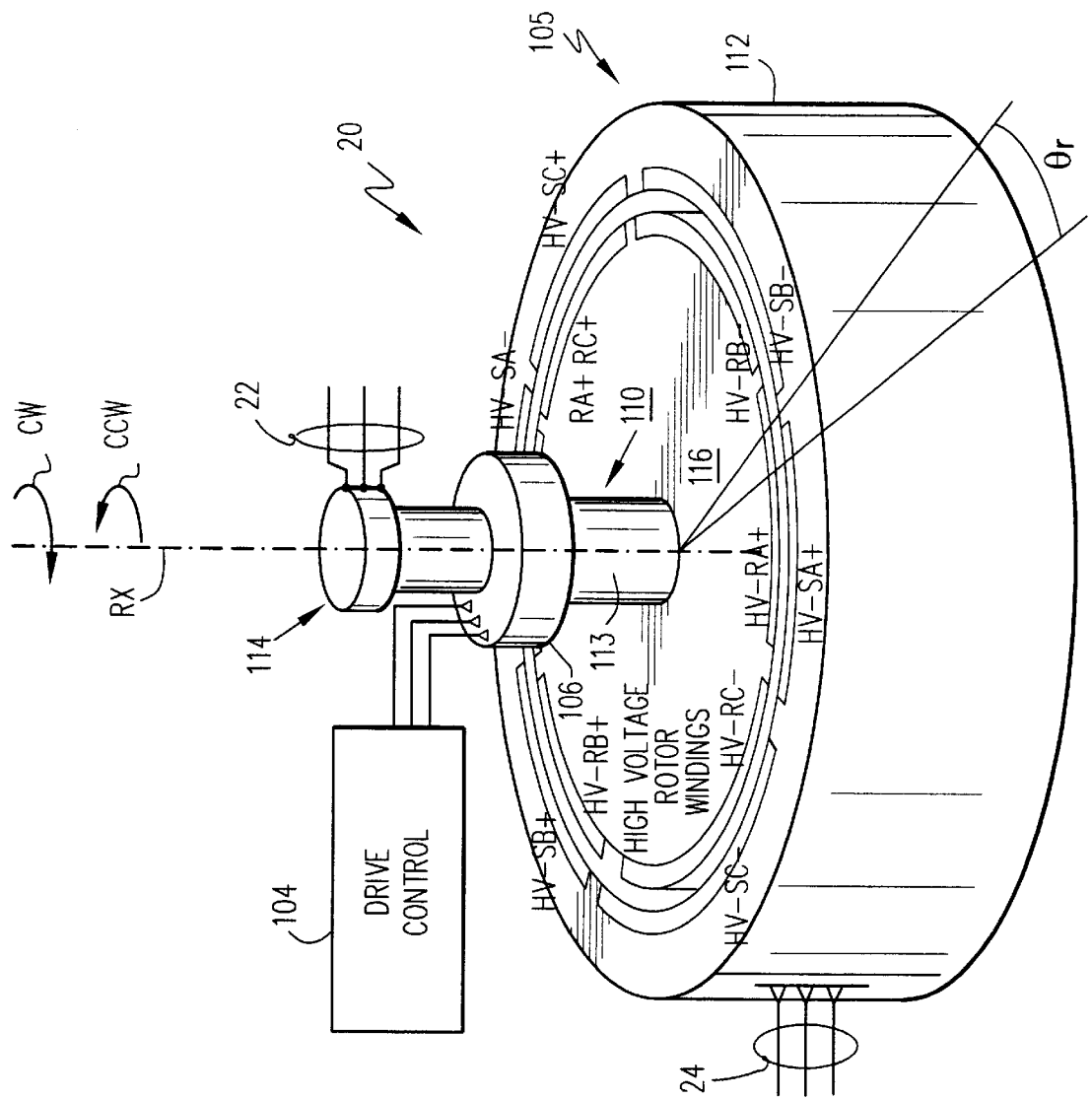
FIG. 2 is a partial schematic, partial perspective view of portions of the variable frequency rotary transformer system of FIG. 1.

In the example embodiment shown in FIG. 2, the illustrated variable frequency rotary transformer system 20 is wound with sixty degree phase belts (a different number of phase belts can be utilized with the present invention). The present invention advantageously employs high power cables for the windings of both the rotor subassembly 110 and stator 112. These high power cables used for the rotor windings are depicted generally by their phase belts HV-RA+, HV-RC−; HV-RB+; HV-RA−; HV-RC+; and HV-RB− in FIG. 2, while the high power cables used for the stator windings are depicted generally as HV-SA+, HV-SC−; HV-SB+; HV-SA−; HV-SC+; and HV-SB− in FIG. 2. As explained herein, the use of the high power cables in lieu of conventional windings enables the variable frequency rotary transformer system 20 to connect to the first electrical system and the second electrical system, without the use of transformers as otherwise would be required.

The drive motor 104 rotates the rotor subassembly 110 in response to a drive signal generated by drive control system 104. The first and second electrical systems may have a differing electrical characteristic (e.g., frequency or phase). The control system 104 can bi-directionally operate the rotor subassembly 110 at a variable speed for transferring power from the first electrical system to the second electrical system or vise versa (i.e., from the second electrical system to the first electrical system). Further information describing the structure and the operation of variable frequency rotary transformer system 20 generally and variations thereof is provided in the following, all of which are incorporated herein by reference in their entirety: U.S. Pat. Nos. 5,953,225; 5,742,515; 5,841,267; 5,952,816; U.S. patent application Ser. No. 08/825,502; and U.S. patent application Ser. No. 09/443,220.

Figure 3:
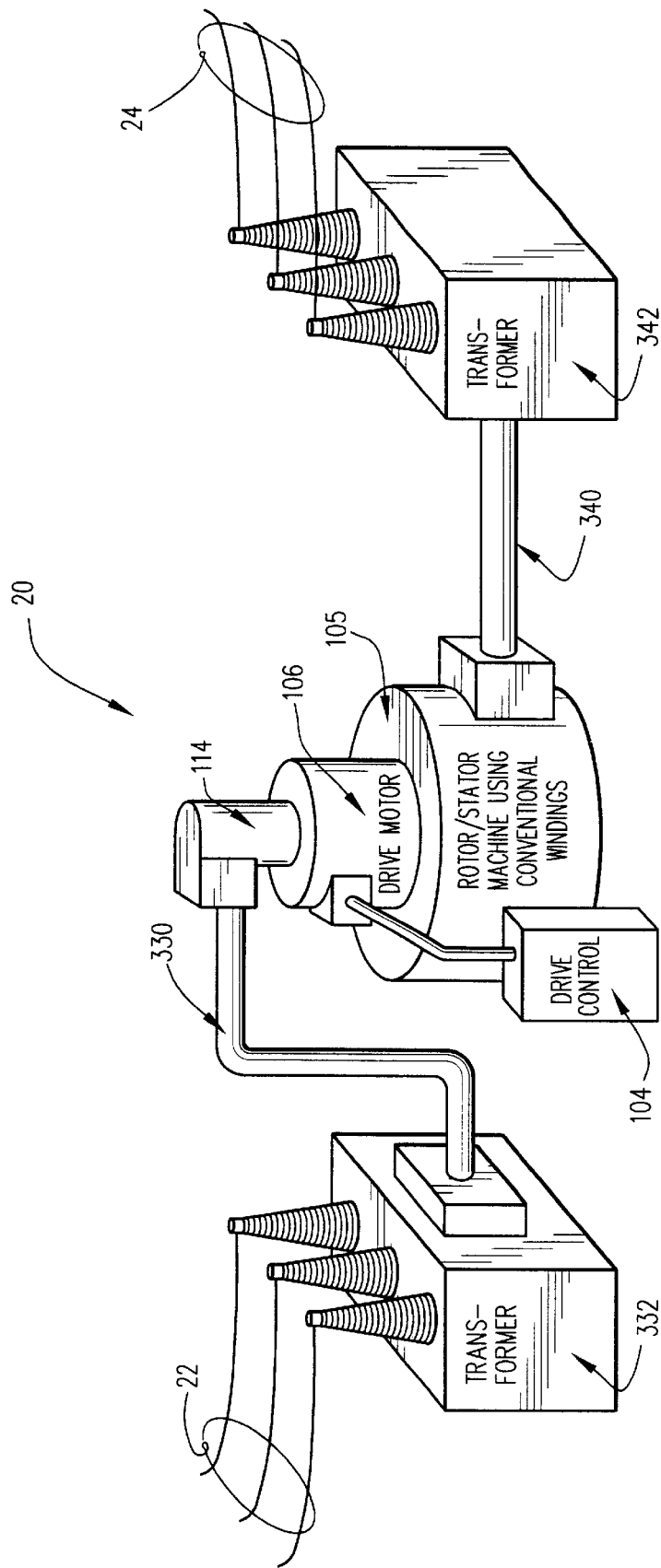
FIG. 3 is a diagrammatic view of a variable frequency rotary transformer system without the high voltage cables of the present invention.

Since rotating electrical machines are normally manufactured and designed at operating voltages of 4 kV to 25 kV, then in order to connect to typical transmission level voltages of 15 kV to 400 kV, such a system would need to have a transformer on each side. In this regard, FIG. 3 shows the employment of variable frequency rotary transformer system without the invention of assembling the windings from high voltage cables. In particular, FIG. 3 shows that without the inventive use of high voltage cables, the collector ring assembly 114 is connected through an ISO-phase bus 330 and transformer 332 to the first electrical system, while the stator is connected by an ISO-phase bus 340 and transformer 342 to the first electrical system. The transformer 332 and transformer 342 are necessary in the FIG. 3 scheme to get the transmission voltage down to levels more commonly associated with rotating machinery.

Figure 1A:
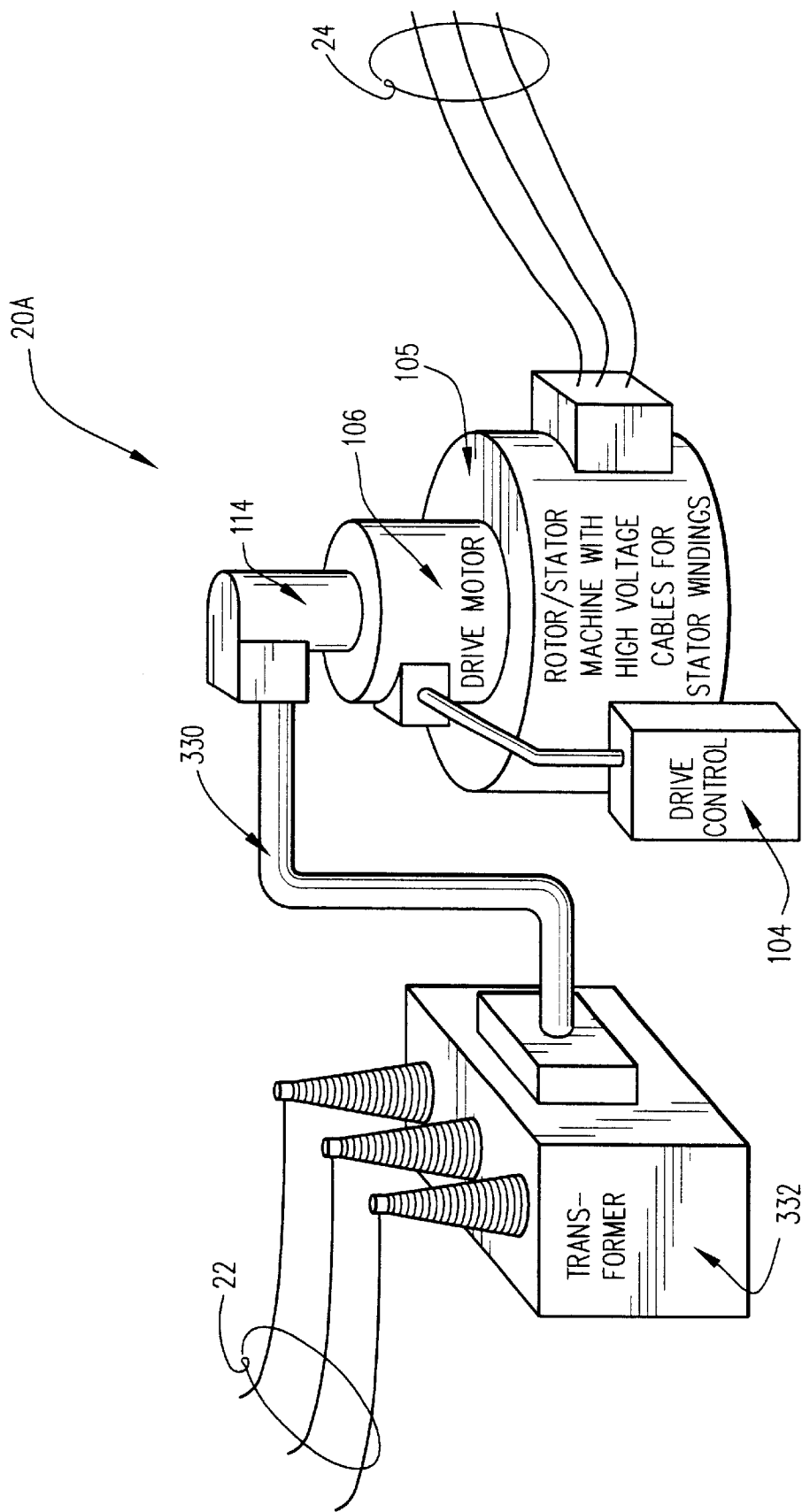
FIG. 1A is a diagrammatic view of a variable frequency rotary transformer system according to a second embodiment of the invention.
Figure 1B:
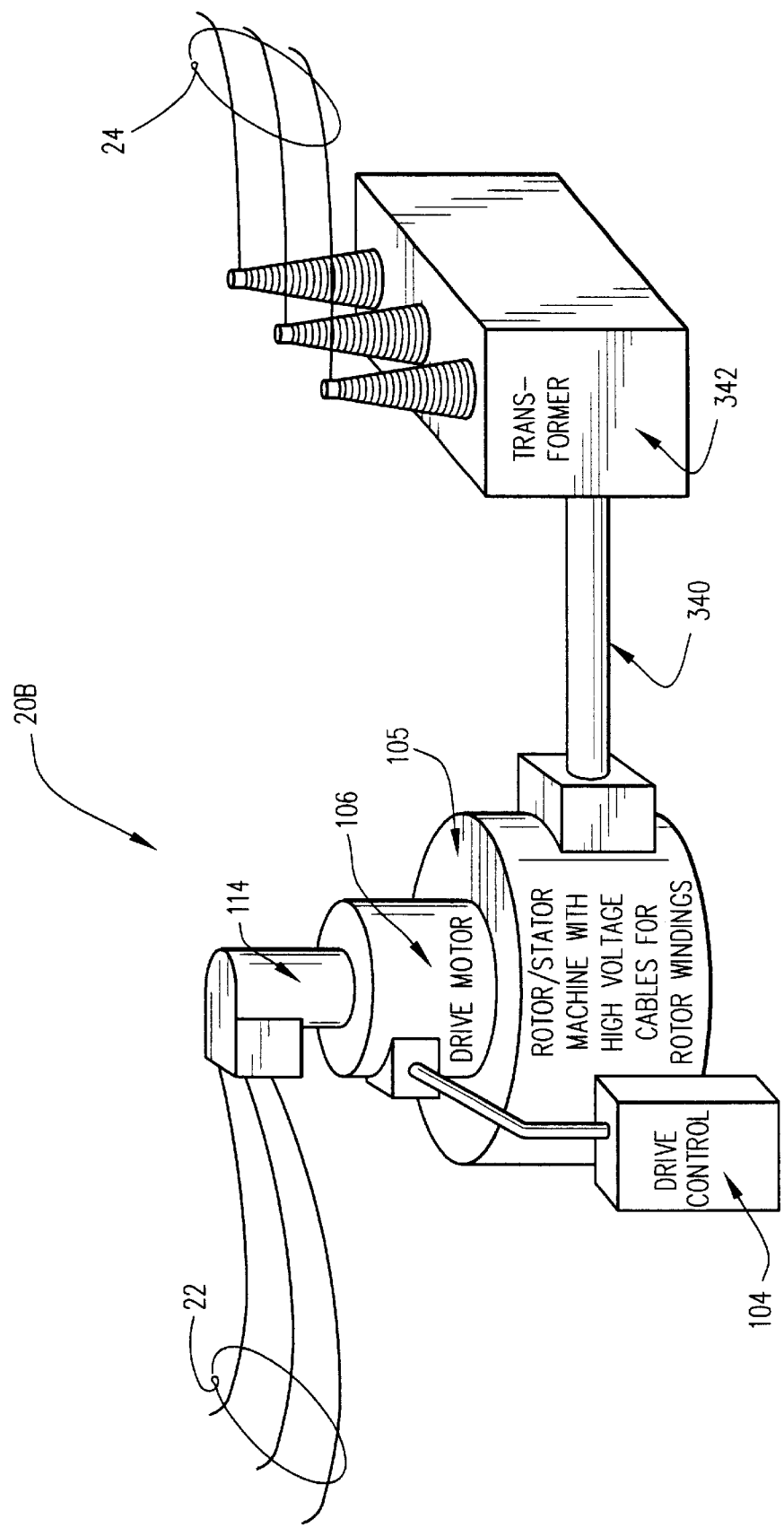
FIG. 1B is a diagrammatic view of a variable frequency rotary transformer system according to a third embodiment of the invention.

It should be understood that the present invention encompasses the rotor windings, the stator windings, or both being made with high voltage cables. For example, FIG. 1A shows a variation of the variable frequency rotary transformer system 20A wherein high voltage cables are employed only for the stator windings. FIG. 1B, on the other hand, shows yet another variation of the variable frequency rotary transformer system 20B wherein high voltage cables are employed only for the rotor windings.

Thus, the present invention connects two power systems together which may not necessarily be the same frequency, or they may have the same nominal frequency and differ instantaneously by small amounts, or they may in fact be a 50 Hz verses 60 Hz interconnection application where there is a consistence difference. A rotating electrical machine provides the transformer action between the two systems, and a torque machine provides the torque part of the power transfer.

In the variable frequency rotary transformer system 20 of the present invention, one or more of either of its rotor or stator windings is formed with high voltage cables and is connected directly to the transmission system. The high voltage cables do not necessarily have the same voltages, depending on the design configuration desired.

As used herein, a "high voltage" cable is capable of operation with greater than 30 kV, and may operate as high as 100 kV or even higher (e.g., 500 kV). Example high voltage operation scenarios include 69 kV and 138 kV. A high voltage cable preferably has an extruded insulation system. Example compositions for high voltage cables include cross-linked polyethylene (XLPE) and ethylene propylene rubber EPR.

The present invention has many advantages, including elimination of one or more transformers. The variable frequency rotary transformer system 20 is essentially a single transforming device which connects grids of two different operating characteristics (e.g., frequencies). The variable frequency rotary transformer system 20 as shown in FIG. 1 has high voltage on the stator, across the air gap between rotor and stator, and on the rotor subassembly 110.

The present invention thus can reduce the cost of layout of the variable frequency rotary transformer system, and enhances performance. The variable frequency rotary transformer system 20 requires less footprint, fewer parts, higher reliability, and enhanced efficiency. Characteristics of the variable frequency rotary transformer system 20 can be tailored to particular sites.

As a variation, the variable frequency rotary transformer system can have its rotor conductors and normal design voltages of 6 kV–20 kV, with its rotating set of leads connected to an axial transformer. This variation eliminates slip rings from the machine, and has the transformer with the rotating and stationary part which then leads out at transmission level.

High voltage insulation can also be involved in variable frequency rotary transformer system 20. For high voltage insulation, a cooling fluid such as air, hydrogen, oil, or $SF_6$ may be applied as a cooling and partial insulation medium. In this and other regards, see U.S. Provisional Patent Application Serial No. 60/215,670, filed Jun. 30, 2000, entitled "HIGH-POWER ROTARY CURRENT COLLECTOR SYSTEM"; U.S. patent application Ser. No. 09/731,875, filed Dec. 8, 2000, entitled "CLEANING/COOLING OF HIGH-POWER ROTARY CURRENT COLLECTOR SYSTEM"; U.S. patent application Ser. No. 09/731,879, filed Dec. 8, 2000, entitled "ENVELOPE FOR SLIP-RING CONTACTING MEMBERS IN HIGH-POWER ROTARY CURRENT COLLECTOR SYSTEM"; and U.S. patent application Ser. No. 09/731,877, filed Dec. 8, 2000, entitled "SLIP-RING MOUNTING ASSEMBLY FOR HIGH-POWER ROTARY CURRENT COLLECTION SYSTEM", all of which are incorporated herein by reference in their entirety.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for transferring power between a first electrical system and a second electrical system, the system comprising:

a rotary transformer comprising a rotor having rotor windings and a stator having stator windings;

wherein the windings of at least one of the rotor and the stator are high power cables utilized to obviate employment of a transformer between the one of the rotor and the stator and one of the first electrical system and the second electrical system.

2. The system of claim 1, wherein the windings of both the rotor and the stator are high power cables.

3. The system of claim 1, wherein the windings of only the rotor are high power cables.

4. The system of claim 1, wherein the windings of only the stator are high power cables.

5. The system of claim 1, wherein the high power cables are capable of operation with greater than 30 kV.

6. The system of claim 1, wherein the high power cables are formed from one of cross-linked polyethylene and ethylene propylene rubber.

7. The system of claim 1, wherein the first electrical system and the second electrical system have differing frequency.

8. The system of claim 1, further wherein the first electrical system is a first electrical grid and the second electrical system is a second electrical grid.

9. The system of claim 1, further comprising:

a drive control system;

a drive motor which rotates the rotor in response to a drive signal generated by the drive control system.

10. The apparatus of claim 9, wherein the drive control system bi-directionally operates the rotor at a variable speed for transferring power from the first electrical system to the second electrical system or vise versa.

* * * * *